United States Patent [19]
Martin et al.

[11] Patent Number: 5,885,542
[45] Date of Patent: Mar. 23, 1999

[54] HALO-ZEO-TYPE MATERIALS

[75] Inventors: James D. Martin, Apex; Kevin Greenwood, Raleigh, both of N.C.

[73] Assignee: North Carolina State University, Raleigh, N.C.

[21] Appl. No.: 915,653

[22] Filed: Aug. 21, 1997

Related U.S. Application Data

[60] Provisional application No. 60/024,319 Aug. 22, 1996.

[51] Int. Cl.$^6$ .............................. C01G 3/05; C01G 9/04
[52] U.S. Cl. ......................... 423/463; 423/470; 423/472
[58] Field of Search .................................. 423/470, 472, 423/463, 700, 705, 713

[56] References Cited

U.S. PATENT DOCUMENTS

| | | |
|---|---|---|
| 3,440,296 | 4/1969 | Walker . |
| 3,702,828 | 11/1972 | Hoffman et al. . |
| 3,766,080 | 10/1973 | Swinehart et al. . |
| 3,922,331 | 11/1975 | MacDonald et al. ................... 423/472 |
| 3,947,556 | 3/1976 | Jones et al. ............................. 423/463 |
| 3,947,557 | 3/1976 | Jones et al. ............................. 423/463 |
| 4,099,984 | 7/1978 | Christenson et al. . |
| 4,100,183 | 7/1978 | Christenson et al. . |
| 4,102,802 | 7/1978 | Johnson et al. . |
| 4,111,991 | 9/1978 | Garrison ................................. 423/472 |
| 4,129,519 | 12/1978 | Matsuzawa . |
| 4,141,960 | 2/1979 | Long et al. . |
| 4,997,597 | 3/1991 | Clough et al. . |
| 5,100,587 | 3/1992 | Clough et al. . |
| 5,385,716 | 1/1995 | Bogdanovic et al. ................... 423/463 |

*Primary Examiner*—Mark L. Bell
*Assistant Examiner*—David Sample
*Attorney, Agent, or Firm*—Myers Bigel Sibley & Sajovec, P.A.

[57] ABSTRACT

Disclosed herein is a novel class of halide-based framework solids based on a $Zn_nCl_{2n}$ parentage, as zeo-types are related to $Si_nO_{2n}$. These materials, referred to as halo zeo-type materials, constructed from Lewis acidic and redox active tetrahedral building blocks, should augment the size and shape selectivity characteristics of zeolites. One example of these materials, compound CZX-1, has the formula $[NH(CH_3)_3]CuZn_5Cl_{12}$. Another example of these materials, compound CZX-2, has the formula $[NH_2(CH_2CH_3)_2]CuZn_5Cl_{12}$. Compound CZX-3 has the formula $[H_2N(CH_3)_2]_n[Cu_nZn_{6-n}Cl_{12}]$, wherein n may be 1 or 2. Compound CZX-4 has the formula $[A]_n[Cu_2Zn_2Cl_7]$, wherein A may be $H_3NCH_3^+$ or $Rb^+$. The invention also relates to colloidal suspensions which may utilize the halide-based compounds.

5 Claims, 3 Drawing Sheets

HALO-ZEO-TYPE MATERIALS

CROSS REFERENCE TO RELATED APPLICATIONS

The instant application is related to and claims priority from United States Provisional Application Ser. No. 60/024,319 filed Aug. 22, 1996.

BACKGROUND OF THE INVENTION

Solid-state chemists, following nature's geologic examples, have transformed common silicate, aluminate, and phosphate building-blocks into zeo-type materials with elaborate structural frameworks. These porous materials provide molecular sieve and catalysis technology vital to countless applications in diverse industries. There is an ongoing need for new materials having such properties.

SUMMARY OF THE INVENTION

Disclosed herein is a novel class of halide-based framework solids based on a $Zn_nCl_{2n}$ parentage, as zeo-types are related to $Si_nO_{2n}$. These materials, referred to as halo zeo-type materials, constructed from Lewis acidic and redox active tetrahedral building blocks, should augment the size and shape selectivity characteristics of zeo-type frameworks.

A first aspect of the present invention is the compound CZX-1. CZX-1 has the formula $[NH(CH_3)_3]CuZn_5Cl_{12}$, and has the crystal structure given in Table 1 below.

A second aspect of the present invention is the compound CZX-2. CZX-2 has the formula $[NH_2(CH_2CH_3)_2]CuZn_5Cl_{12}$, and has the crystal structure given in Table 2 below.

A third aspect of the present invention is the compound CZX-3. CZX-3 has the formula $[H_2N(CH_3)_2]_n[Cu_nZn_{6-n}Cl_{12}]$, wherein n may be 1 or 2. CZX-3 has the crystal structure given in Table 3.

A fourth aspect of the present invention is the compound CZX-4. CZX-4 has the formula $[A]_n[Cu_2Zn_2Cl_7]$, wherein A may be $H_3NCH_3^+$ or $Rb^+$. CZX-4 has the crystal structure given in Table 4.

The foregoing and other objects and aspects of the present invention are explained in detail in the specification set forth below.

DETAILED DESCRIPTION OF THE INVENTION

Figure 1A:
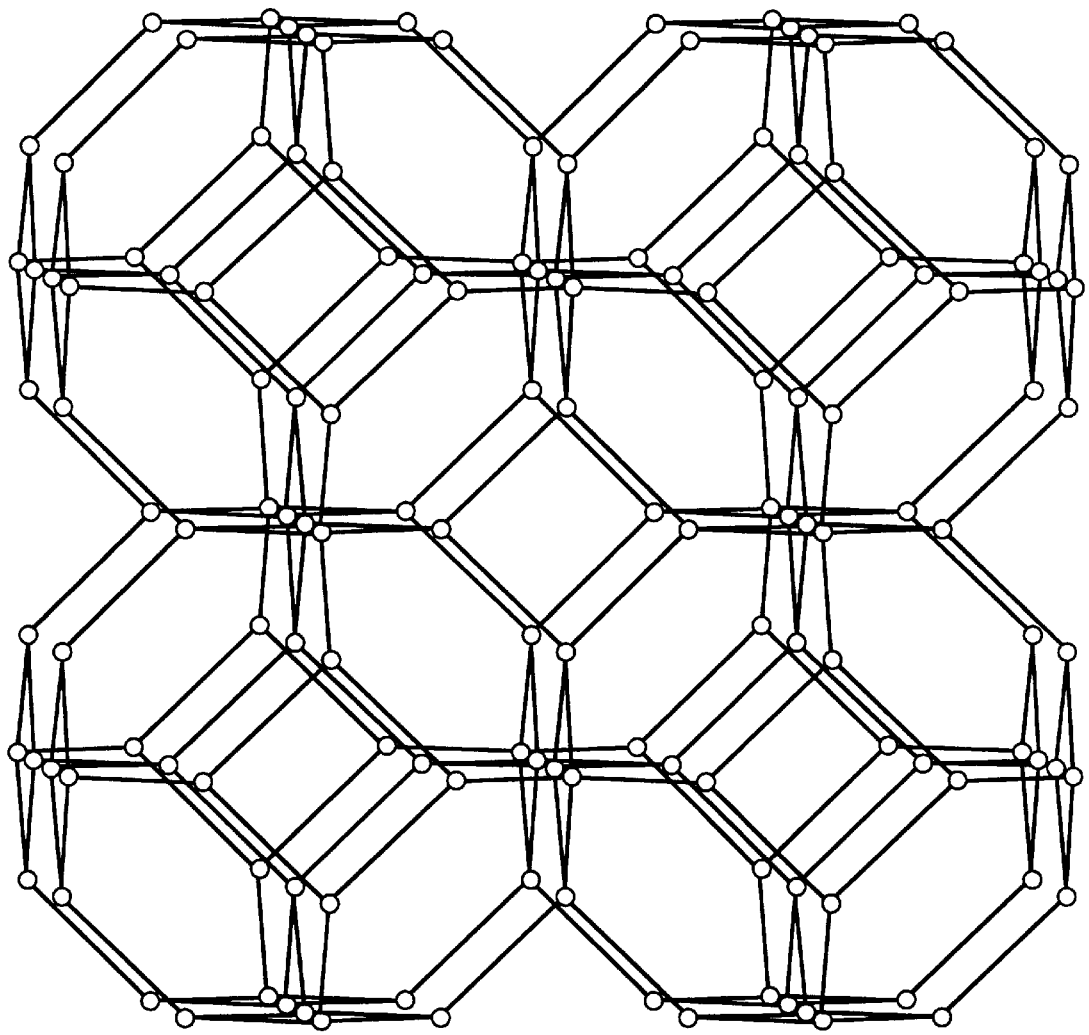
FIGS. 1a–1c describe representation of the skeletal frameworks of CZX-1 (FIG. 1a), CZX-2 and CZX-3 (FIG. 1b), and CZX-4 (FIG. 1c).
Figure 1B:
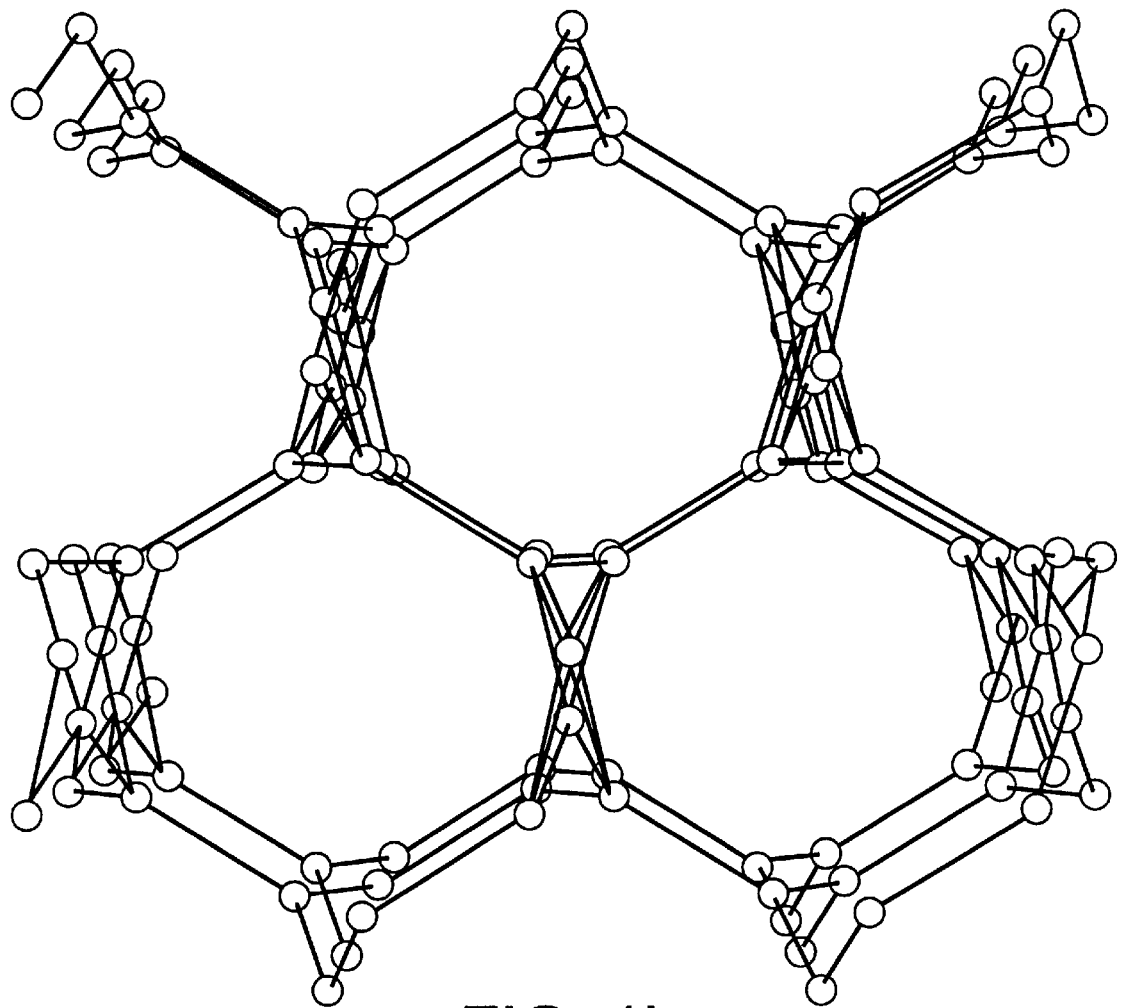
Figure 1C:
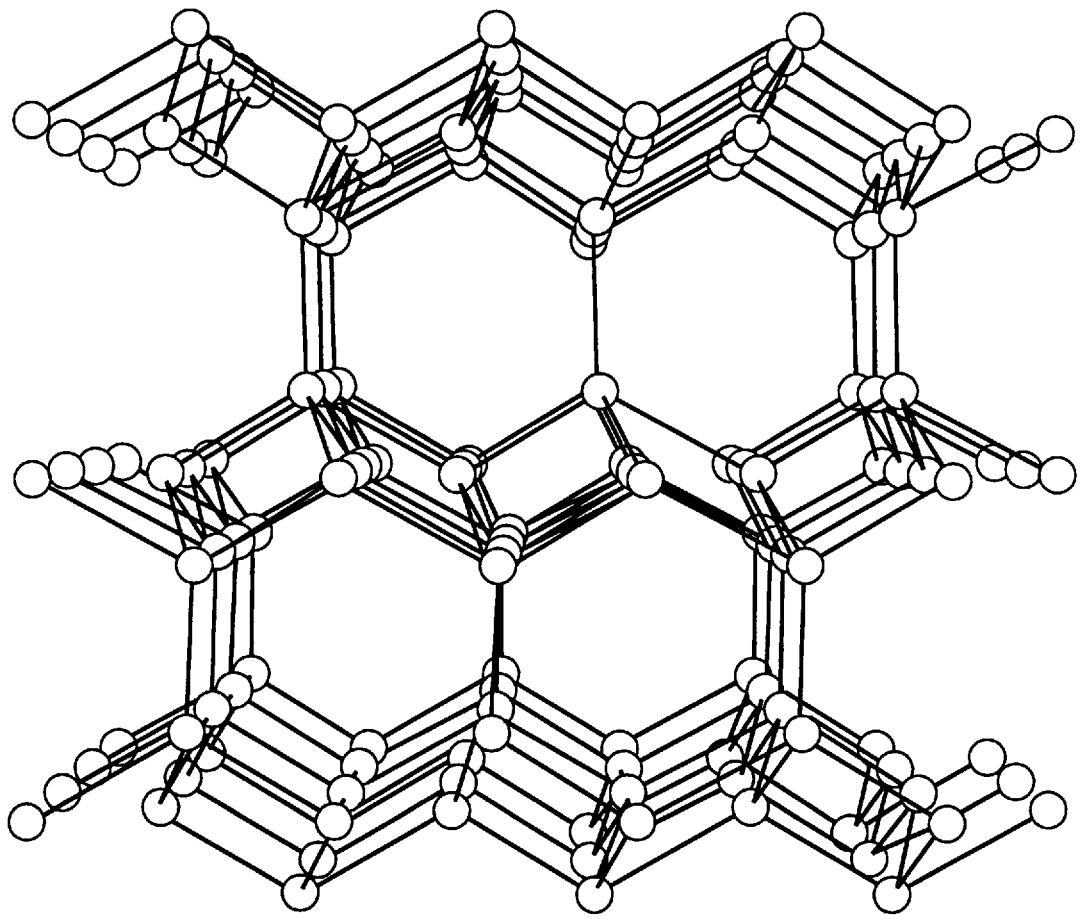

Compounds are disclosed which have the general formula $[Cu_nZn_{m-n}Cl_{2m}]^{n-}$. Various values may be assigned to "n" and "m" including, but not limited to, "n" equal to 1 or 2 and "m" equal to a number between 4 and 6. The compounds of the present invention can be readily synthesized by those skilled in the art. In overview, single crystals of CZX-1, CZX-2, CZX-3, and CZX-4 suitable for X-ray structural determinations, can be grown from superheated benzene solutions (160° C. under autogenous pressure) of CuCl, $ZnCl_2$ and (1) $HNMe_3Cl$ for CZX-1; where "Me" means methyl, (2) $H_2NEt_2Cl$ for CZX-2; where "Et" means ethyl, (3) $[H_2N(Me)_2]Cl$ for CZX-3, and (4)$H_3NMeCl$ or RbCl for CZX-4, respectively. In a dry box with a nitrogen atmosphere, the chloride salt of the templating cation, CuCl, ZnCl and benzene ($C_6H_6$) in an appropriate mole ratio (a mole ratio of 1:1:5:65 for CZX-2 for example) are placed in a thick walled fused silica tube reaction vessel. The reaction vessel is then sealed under vacuum and heated at 160° C. for four hours and then slowly cooled. Samples are also readily prepared from melts, $\leq 200°$ C., of the same compositions, however, microcrystalline products were obtained. Though it is not possible to directly determine the Cu/Zn ratio (or distribution in the framework) by X-ray diffraction, these colorless, diamagnetic materials require that one templating cation ($HNMe_3^+$, $H_2NEt_2^+$, $H_2NMe^+$, or $Rb^+$ must charge balance each $Cu^I$ in the framework. The refinement of the templating cation occupancies in the crystal structure is consistent with EDS measurement of the Cu/Zu ratio of 1:5.

Compounds of the present invention may be used for a variety of purposes. The size and shape of the pores and cavities in these novel metal halide framework materials make them useful as molecular sieves, particularly for gas separations and sensors. The pores and channels of these frameworks also make them useful as hosts for nanoparticles such as quantum confined semiconductor particles. The framework characteristics also make them useful for ion exchange and battery applications by combination of the ion mobility and the $Cu^I/Cu^{II}$ redox couple.

Compounds of the present invention are also useful for a variety of catalytic applications. These novel materials add size and shape selectivity to known redox catalysis based on the $Cu^I/Cu^{II}$ redox couple such as reduction of carbon monoxide or oxidative coupling reactions. In addition, $ZnCl_2$ has known utility as a Lewis acid and as an alkyl transfer agent. Various forms of $CuCl/O_2$ are valuable oxidation catalysts. As such oxidation catalysts, CZX-1, CZX-2, CZX-3, and CZX-4 have well isolated copper sites in a size and shape selective cavity, like an "inorganic enzyme." This is a reminiscent of copper-containing metalloproteins that reduce dioxygen under ambient conditions.

CZX-1 crystallizes in the I-43m acentric space group, and CZX-2 and CZX-3 crystallize in the acentric space groups and $I2_12_12_1$, the former is both polar and acentric. CZX-4 crystallizes in the monoclinic space group Pn with $H_2NMe^+$ and the orthorhombic space group $P2_1nm$ with $Rb^+$. These crystal symmetries and the polarizability of the metalchlorine bonds make these materials useful for piezoelectricity and second harmonic generation (e.g., as pieazoelectric crystals and for nonlinear optical devices such as frequency doublers). In addition, these materials are colorless and optically transparent, making them useful for the fabrication of optical components.

The invention also encompasses colloidal suspensions which may comprise the compounds described herein. The colloidal suspensions may be prepared using known techniques. For example, suspensions with particle sizes of about 100 nm (measured by optical microscopy) may be prepared by adding an alcohol (e.g., methanol) or water. Preferably, from about 20 to about 40 molar equivalents of alcohol or water are combined with one molar equivalent of compound which is employed. More preferably, about 40 molar equivalents of methanol are employed for one molar equivalent of compound. The resulting colloidal suspension may remain suspended for days. Concentrating the colloidal suspension using suitable apparatus (e.g., a nitrogen filled dry-box) may yield a homogeneous paste with the appearance and consistency of a typical commercial glue. The colloidal suspensions are advantageous in that they are capable of providing an increased surface area which may allow for greater catalytic activity when the compounds are employed in processes.

The present invention is explained in greater detail in the following non-limiting examples. In these examples, "Me" means methyl, "Et" means ethyl, "EDS" means energy dispersive spectroscopy, and temperatures are given in degrees centigrade.

EXAMPLE 1

Synthesis of CZX-1, CZX-2, CZX-3, and CZX-4

Crystalline compounds of the invention were synthesized from superheated solutions of alkylammonium chloride (or RbCl in the case of one embodiment of CZX-4), CuCl, $ZnCl_2$, and benzene used in various molar ratios. The molar ratios generally varied from 1:1:5:45 to 1:1:5:65. When synthesizing the compounds, amounts of the reactants are varied so as to be consistent with the chemical formulae of the resulting compounds. With respect to CZX-1, 25 mg of CuCl, 170 mg of $ZnCl_2$, and 24 mg of $HNMe_3Cl$ were added to a thick walled fused silica tube. Using standard Schlenk techniques, 1.0 ml of benzene was added to this reaction vessel. The reaction mixture was frozen in liquid nitrogen and sealed using a torch such that the reaction tube was filled to 25 percent. Hardened solids from which colorless single crystals could be cleaved were prepared by cooling the benzene solutions from 160° C. to 60° C. at 0.01 degree/min. The procedure was repeated using appropriate reactants for CZX-2 and CZX-3. The elemental analyses for the materials were as follows: CZX-1 (calculated for $C_3H_{10}Cl_{12}CuNZn_5$): C, 4.1; H, 1.2; N, 1.6. Found C, 4.3: H, 1.3; N, 1.6. CZX-2 (calculated for $C_4H_{12}Cl_{12}CuNZn_5$): C, 5.4; H, 1.4; N, 1.6. Found C, 5.3: H, 1.5; N, 1.4. CZX-3 (calculated for $C_4H_{16}Cl_{12}Cu_2N_2Zn_4$): C, 5.3; H, 1.8; N, 3.1. Found C, 5.3: H, 2.0; N, 3.0.

EXAMPLE 2

Crystal Structure of CZX-1

CZX-1 crystallizes in the cubic, acentric space group I-43m with a=10.5887(3) Å. The stoichiometry required by the crystal structure of CZX-1 was confirmed by EDS. The ability to prepare zeo-type analogues with mixed metal halides is readily demonstrated by CZX-1 which adopts the sodalite structure. Copper and zinc atoms reside on a single 4 bar crystallographic site, and are linked through two-coordinate chloride ligands. Each sodalite cage exhibits a free volume of 158 $Å^3$, and is filled by a disordered trimethylammonium cation. The comparison of the calculated density of CZX-1 (2.45 $g/cm^3$) and that of orthorhombic-$ZnCl_2$ (3.00 $g/cm^3$) illustrates the extent to which this halo zeo-type is an open framework. Bond lengths and angles are given in Table 1 below.

TABLE 1

Bond Lengths and Angles for CZX-1

| Bond Lengths (Å) | | Bond Angles (E) | |
|---|---|---|---|
| T-Cl | 2.285 (2) × 4 | Cl-T-Cl | 107.82 (3) × 4 |
| | | | 112.83 (3) × 2 |

T = tetrahedral metal site, occupied by Cu and Zn.

EXAMPLE 3

Crystal Structure of CZX-2

CZX-2 crystallizes in the acentric space group $I2_12_12_1$ with a=9.6848(5) Å, b=9.5473(4) Å, and c=14.0003(9) Å. The stoichiometry determined by the crystal structure was confirmed by EDS. CZX-2 displays a novel zeo-type framework constructed with 3-ring secondary building units (SBU). These SBUs link to form circular channels parallel to b with 11-ring apertures. Additional 8-ring channels parallel to the body diagonal (111); link the pores in a three-dimensional network. 4-ring and 6-ring channels are observed parallel to a. The free volume of the channels is 382 $Å^3$/unit cell (Z=2), and the calculated density of the structure is 2.28 $g/cm^3$. Bond lengths and angles are given in Table 2 below.

TABLE 2

Bond Lengths and Angles for CZX-2.

| Bond Lengths (Å) | | Bond Angles (E) | |
|---|---|---|---|
| T1-C11 | 2.288 (2) × 2 | C11-T1-C11 | 114.62 (9) |
| T1-C12 | 2.315 (2) × 2 | C11-T1-C12 | 114.24 (7) |
| T2-C11 | 2.273 (2) | | 103.82 (6) |
| T2-C12 | 2.275 (2) | C12-T1-C12 | 106.08 (8) |
| T2-C13 | 2.291 (1) | C11-T2-C13 | 105.96 (7) |
| | | C11-T2-C14 | 108.36 (5) |
| | | C12-T2-C13 | 108.27 (5) |
| | | C12-T2-C14 | 108.93 (7) |
| | | C13-T2-C14 | 111.05 (6) |

T = tetrahedral metal site, occupied by Cu and Zu. The distribution of Cu and Zn over the two T sites in CZX-2 has not been conclusively determined.

EXAMPLE 4

Crystal Structure of CZX-3

CZX-3 crystallizes in the acentric space group $I2_12_12_1$ with a=9.5677(16) Å, b=9.4554(12) Å, and c=13.6435(16) Å. The stoichiometry required by the crystal structure of CZX-3 was confirmed by EDS. CZX-3 displays a novel zeo-type framework constructed with 3-ring secondary building units (SBU). These SBUs link to form circular channels parallel to b with 11-ring apertures. Additional 8-ring channels parallel to the body diagonal (111); link the pores in a three-dimensional network. 4-ring and 6-ring channels are observed parallel to a. The calculated density of the structure is 2.439 $g/cm^3$. Bond lengths and angles are given in Table 3 below.

TABLE 3

Bond Lengths and Angles for CZX-3.

| Bond Lengths (Å) | | Bond Angles (°) | |
|---|---|---|---|
| T1-C13 | 2.279 (3) × 2 | C13-T1-C13 | 114.74 (16) |
| T1-C14 | 2.284 (4) × 2 | C13-T1-C14 | 114.80 (12) |
| T2-C13 | 2.314 (4) | | 102.40 (12) |
| T2-C14 | 2.285 (4) | C14-T1-C14 | 107.94 (15) |
| T2-C15 | 2.293 (3) | C13-T2-C14 | 113.16 (14) |
| T2-C16 | 2.298 (3) | C13-T2-C15 | 103.38 (14) |
| | | C13-T2-C16 | 107.76 (10) |
| | | C14-T2-C15 | 107.84 (11) |
| | | C14-T2-C16 | 111.35 (13) |
| | | C15-T2-C16 | 113.18 (11) |

EXAMPLE 5

Synthesis of CZX-4

CZX-4 crystallizes in the monoclinic space group Pn, with a=6.3098(8) Å, b=6.6339(8) Å, and c=15.569(2) Å, wherein $A=H_3NMe^+$ and $β=91.11(1)°$. The compound exhibits a polar axis. CZX-4 may also crystallize in the orthorhombic space group P2₁nm, with a=6.06 Å, b=6.52 Å, and c=15.39 Å, wherein A=Rb⁺. Both compounds crystallize in acentric space groups and the later has a polar axis.

It is believed that the CZX-4 framework structure is not a direct zeo-type analog, but is isostructural with $BaAl_4S_7$. The CZX-4 structure may demonstrate that similar open framework structures may be constructed by small variations from the prescribed $[Cu_nZn_{m-n}Cl_{2m}]^{n-}$ formulation. In this structure, the templating cations sit in cages that are surrounded by 12 nearest neighbor chloride anions. These cages are connected by six ring windows forming channels along the a and b directions which are believed to allow for the possibility of cation mobility and ion exchange. The calculated density of the structure is 2.74 g/cm³. CZX-4 may be synthesized by procedures similar to those employed in synthesizing CZX-1 and CZX-2. Bond lengths and angles are given in Table 4 below.

TABLE 4

Bond lengths and angles for CZX-4

| Bond Lengths (Å) | | Bond Angles (°) | |
|---|---|---|---|
| T1-C11 | 2.402 (10) | C1-T-C1 Range: | 102.5 (3) to 121.4 (3) |
| T1-C12 | 2.439 (7) | | |
| T1-C13 | 2.300 (8) | | |
| T1-C15 | 2.283 (8) | | |
| T2-C11 | 2.484 (7) | | |
| T2-C12 | 2.413 (11) | | |
| T2-C14 | 2.290 (10) | | |
| T2-C16 | 2.296 (9) | | |
| T3-C11 | 2.279 (9) | | |
| T3-C13 | 2.262 (11) | | |
| T3-C16 | 2.249 (7) | | |
| T3-C17 | 2.306 (8) | | |
| T4-C12 | 2.285 (8) | | |
| T4-C14 | 2.257 (11) | | |
| T4-C15 | 2.253 (7) | | |
| T4-C17 | 2.332 (9) | | |

EXAMPLE 4

Methanol Absorption by Colloidal Suspensions

The absorption of methanol by colloidal suspensions employing compounds of the present invention was investigated. Methanol was passed over compounds CZX-1, CZX-2, and CZX-3 as well as liquid $ZnCl_2$ and solid CuCl, in an appropriate apparatus at 30° C. in a nitrogen atmosphere. For the compound CZX-3, the molar ratio of zinc to copper was 5:1 in one sample (n=1), 4:2 in the second sample (n=2). The compounds were then purged with nitrogen and the amount of methanol desorbed in the nitrogen purge was determined. The equivalents of methanol absorbed and remaining after a dry nitrogen purge were determined by gravimetric analysis and are set forth in Table 5 below.

As shown, the solid CuCl was not capable of incorporating any of the methanol into its structure, whereas ZnCl2 adsorbed methanol forming a liquid solvate. By contrast, the CZX materials both adsorbed methanol and formed colloidal suspensions. The compounds of the invention demonstrate the capability of incorporating molecules into their framework. Accordingly, the compounds of the invention may display sieve-like functions in that they are able to discriminate which type of materials may be adsorbed by the compound structures.

In general, while some of the adsorbed methanol may be necessary for stabilization of the colloid, additional methanol is able to be absorbed within the structures of CZX-2 and CZX-3 (n=1). In this instance, the framework of these materials is constructed with only half the templating sites occupied. The remaining sites can be occupied with additional solvent molecules such that these materials can adsorb 1.8 moles of methanol per framework-formula-unit more than the corresponding fully stuffed CZX-3 (n=2) framework.

TABLE 5

Methanol sorption/desorption of halo zeo-type compounds

| | MeOH Wetted $N_2$ | dry $N_2$ purge |
|---|---|---|
| $ZnCl_2$ | 3.5 | 0.9 |
| CuCl | 0.0 | 0.0 |
| CZX-1 | 2.3 | 0.5 |
| CZX-2 | 2.5 | 0.8 |
| CZX-3 (1 Cu:5 Zn) | 2.4 | 0.8 |
| CZX-3 (2 Cu:4 Zn) | 1.6 | 0.5 |

The foregoing examples are illustrative of the present invention, and are not to be construed as limiting thereof. The invention is defined by the following claims, with equivalents of the claims to be included therein.

That which is claimed is:

1. A compound CZX-1 having the formula $[NH(CH_3)_3]CuZn_5Cl_{12}$ and having the crystal structure given in Table 1.

2. A compound CZX-2 having the formula $[NH_2(CH_2CH_3)_2]CuZn_5Cl_{12}$ and having the crystal structure given in Table 2.

3. A compound CZX-3 having the formula $[H_2N(CH_3)_2]_n[CuZn_{6-n}Cl_{12}]$, wherein n is 1 or 2, and having the crystal structure given in Table 3.

4. A compound CZX-4 having the formula $[A]_nCu_2Zn_2Cl_7$, wherein A is $H_3NCH_3$ or Rb⁺, and having the crystal structure given in Table 4.

5. A colloidal suspension comprising at least one compound selected from the group consisting of:

CZX-1 having the formula $[NH(CH_3)_3]CuZn_5Cl_{12}$ and having the crystal structure given in Table 1;

CZX-2 having the formula $[NH_2(CH_2CH_3)_2]CuZn_5Cl_{12}$ and having the crystal structure given in Table 2;

CZX-3 having the formula $[H_2N(CH_3)_2]_n[CuZn_{6-n}Cl_{12}]$, wherein n is 1 or 2, and having the crystal structure given in Table 3; and CZX-4 having the formula $[A]_nCu_2Zn_2Cl_7$, wherein A is $H_3NCH_3$ or Rb⁺, and having the crystal structure given in Table 4.

* * * * *

UNITED STATES PATENT AND TRADEMARK OFFICE
CERTIFICATE OF CORRECTION

PATENT NO. : 5,885,542

DATED : March 23, 1999

INVENTOR(S) : James D. Martin et al.

It is certified that error appears in the above-identified patent and that said Letters Patent is hereby corrected as shown below:

On the title page: Item [54] and Column 1, line 1,

Title [54], "HALO-ZEO-TYPE MATERIALS"
should read
--HALO ZEO-TYPE MATERIALS--.

Signed and Sealed this

Seventh Day of December, 1999

Attest:

Q. TODD DICKINSON

Attesting Officer

Acting Commissioner of Patents and Trademarks